United States Patent

Pluber

[11] Patent Number: 5,816,126
[45] Date of Patent: Oct. 6, 1998

[54] CUTTER FOR SHORTENING BLINDS

[75] Inventor: Ehud Pluber, Kiryat Tivon, Israel

[73] Assignee: Holis Metal Industries, Ltd. Israeli Co., Afula Ilit, Israel

[21] Appl. No.: 595,770

[22] Filed: Feb. 2, 1996

[51] Int. Cl.⁶ ..................................................... B26D 7/28
[52] U.S. Cl. ................................ 83/167; 83/627; 29/24.5
[58] Field of Search .......................... 83/452, 627, 471.1, 83/167, 618, 620, 622; 29/24.5

[56] References Cited

U.S. PATENT DOCUMENTS

| | | | |
|---|---|---|---|
| 4,275,628 | 6/1981 | Greenhouse | 83/622 |
| 4,790,226 | 12/1988 | Tsuchida | 83/949 |
| 4,819,530 | 4/1989 | Huang | 83/39 |
| 4,993,131 | 2/1991 | Graves et al. | 29/24.5 |
| 5,022,296 | 6/1991 | Eschauzier et al. | 83/60 |
| 5,056,388 | 10/1991 | Dekker et al. | 83/666 |
| 5,333,365 | 8/1994 | Marocco et al. | 83/562 |
| 5,339,716 | 8/1994 | Sands et al. | 83/452 |
| 5,456,149 | 10/1995 | Elsenheimer et al. | 29/24.5 |

FOREIGN PATENT DOCUMENTS

58615  4/1913  Austria.

*Primary Examiner*—Maurina T. Rachuba
*Attorney, Agent, or Firm*—Helfgott & Karas, P.C.

[57] ABSTRACT

A cutter for shortening blinds of the type consisting of a top rail, a bottom rail and a plurality of suspended slats therebetween, the cutter comprising a framework, a stationary matrix fixed with respect to the framework and comprising a first opening for receiving the top rail of the blinds, at least one second opening for receiving the slats in a compacted position, and a third opening for receiving the bottom rail. The first and third openings have shapes corresponding with the cross-sectional shape of the respective top and bottom rails. A support member is slidable with respect to the matrix and comprises a first blade for cutting the top rail, at least one second blades for cutting the slats and a third blade for cutting the bottom rail, at least the first and third blades being flush with a surface of the matrix. The cutter further comprises a displacement mechanism for displacing the support member with respect to the matrix in a direction perpendicular to longitudinal axes of the openings.

12 Claims, 7 Drawing Sheets

CUTTER FOR SHORTENING BLINDS

FIELD OF THE INVENTION

The present invention is in the field of cutting devices for shortening blinds and more specifically it is concerned with a device for shortening blinds of the type comprising a top rail, a bottom rail and a plurality of slats suspended from the top rail by strings. Such blinds are referred as "venetian blinds" or "mini blinds".

BACKGROUND OF THE INVENTION

Blinds of the specified type are highly desirable and may be manufactured in a variety of sizes. However, for reasons of standardizing, manufacturers prefer to produce their products at a selection of standard sizes which do not necessarily suit customers' requirements, and ordering blinds at non-standard sizes, usually turn out to be expensive.

In order to provide the blinds "tailored" to customers' requirements, it has been known to provide blinds in a selection of standard sizes at distribution stations together with suitable cutting means for shortening the blinds to the specific size required by the customer.

One example of such a cutting device is disclosed in U.S. Pat. No. 4,819,530 which is an automatic apparatus for cutting off the ends of pre-assembled venetian blinds. The apparatus comprises a vertical bed for suspending a blind in an opened and taut condition and an automated mechanism for trimming both ends of the slats by twin cutters. After the ends of the slats have been trimmed, the top and bottom rails are shortened by a guillotine arrangement to match the trimmed slats.

This apparatus requires an essentially large space and trained personnel for operating and trimming a blind and the process of shortening a blind is lengthy. Furthermore, the top and bottom rails are cut in a separate process which might lead to uneven trimming.

U.S. Pat. No. 5,339,716 discloses a cutter for blinds comprising a framework which has a receiving area for receiving an end of the blind and a single blade attached to a bar slidably mounted in the framework. The slide bar is operated by an operating handle associated with a rack and gear mechanism, for sliding the single cutter through the end of the blind.

This arrangement requires a long stroke of the operating handle and the blade cuts through different materials, whereby the force applied to the operating handle is uneven along an operating stroke. Moreover, the blade will more often require attending. Furthermore, no means are provided for preventing deformation of the rails during cutting.

It is the object of the present invention to provide an improved cutter for shortening blinds of the specified type, with the above-referred to disadvantages substantially reduced or overcome.

SUMMARY OF THE INVENTION

According to the present invention there is provided a cutter for shortening blinds of the type consisting of a top rail, a bottom rail and a plurality of suspended slats therebetween, the cutter comprising a framework, a stationary matrix fixed with respect to the framework and comprising a first opening for receiving the top rail of the blinds, at least one second opening for receiving the slats in a compacted position, and a third opening for receiving the bottom rail; the first and third openings having shapes corresponding with the cross-sectional shape of the respective top and bottom rails; a support member slidable with respect to the matrix and comprising a first blade for cutting the top rail, at least one second blades for cutting the slats and a third blade for cutting the bottom rail, at least the first and third blades being flush with a surface of the matrix; and a displacement mechanism for displacing the support member with respect to the matrix in a direction perpendicular to longitudinal axes of the openings.

According to a specific embodiment of the invention the distance between the openings is similar to or less than the distance between two adjacent loops of a ladder string linking the slats to the top and bottom rails.

The framework may further comprise clamping means for fixing the blinds within the matrix, whereby the blinds may be rigidly fastened to the frame so as to ensure smooth and even shortening of the blinds' components. In order to improve support of the blinds within the framework during shortening, the framework further comprises guides corresponding with the openings for supporting the rails and slats, the guides having longitudinal axes parallel with axes of the openings.

According to one application a preferred embodiment, the cutter is provided with blocking means for setting the size of the portion cut from the blind. Preferably, integral measuring means are provided.

According to still a preferred embodiment, the at least one second opening of the matrix comprises a lateral projection with rounded edges and wherein the at least one second blade is flush with the lateral projection so that the shortened slats obtain rounded edges. For this purpose, the blinds may be clamped within the matrix so that the slats extend beyond the rails at a rate similar to the size of the lateral projection.

In order to minimize the cutting force and to improve the face quality of the cut blinds, at least the first and third blades have a pointed edge. Preferably, the blades are disposed so as to gradually engage at least the top and bottom rail.

The displacement mechanism for use with the cutter according to the present invention may be a manually operated lever or a hydraulic piston or an electrically operated solenoid.

BRIEF DESCRIPTION OF THE DRAWINGS

For better understanding, the invention will now be described, by way of example only, with reference to the accompanying drawings, in which.

DETAILED DESCRIPTION OF A SPECIFIC EMBODIMENT

Figure 1:
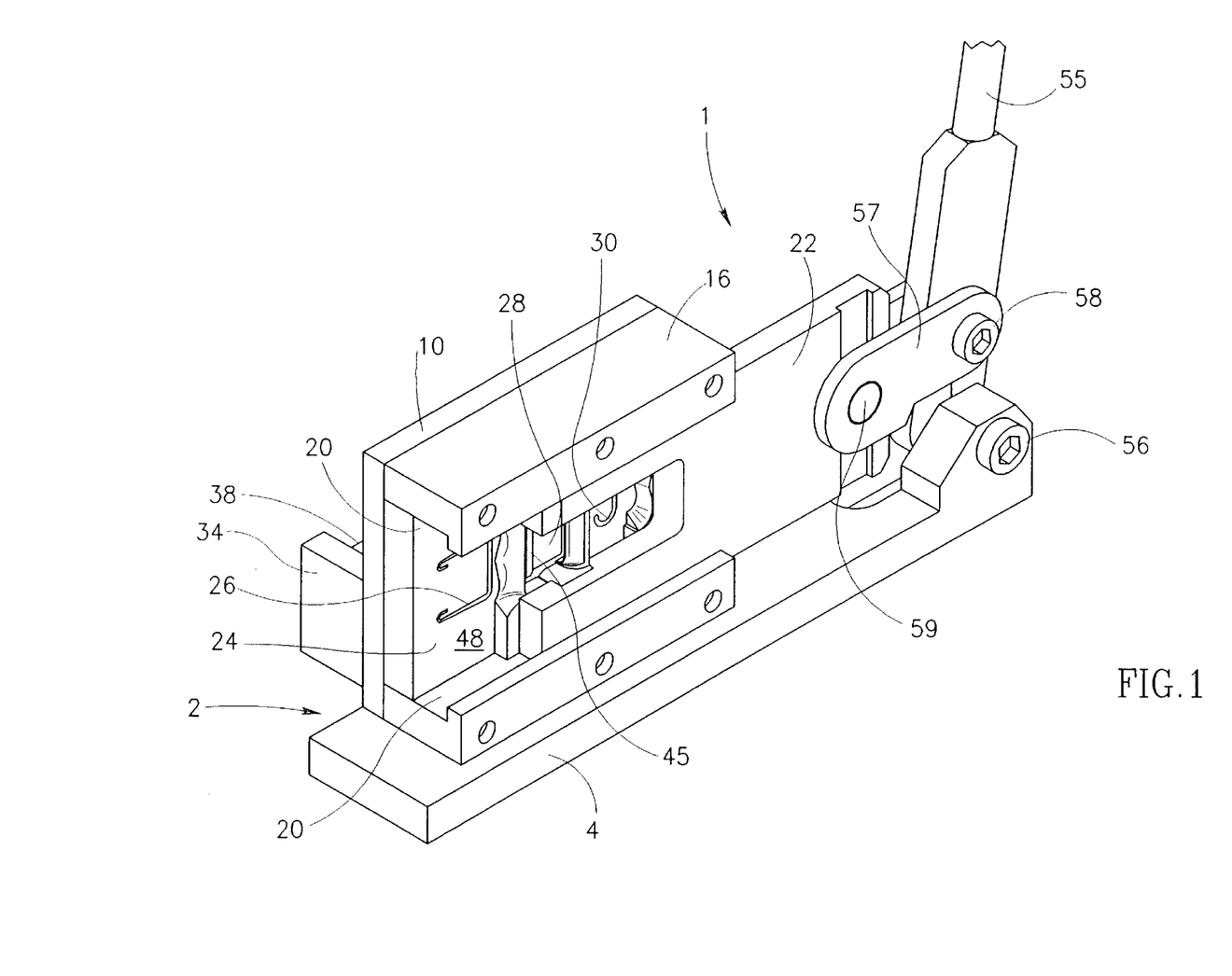
FIG. 1 is an isometric view of the cutter with which the invention is concerned.
Figure 2:
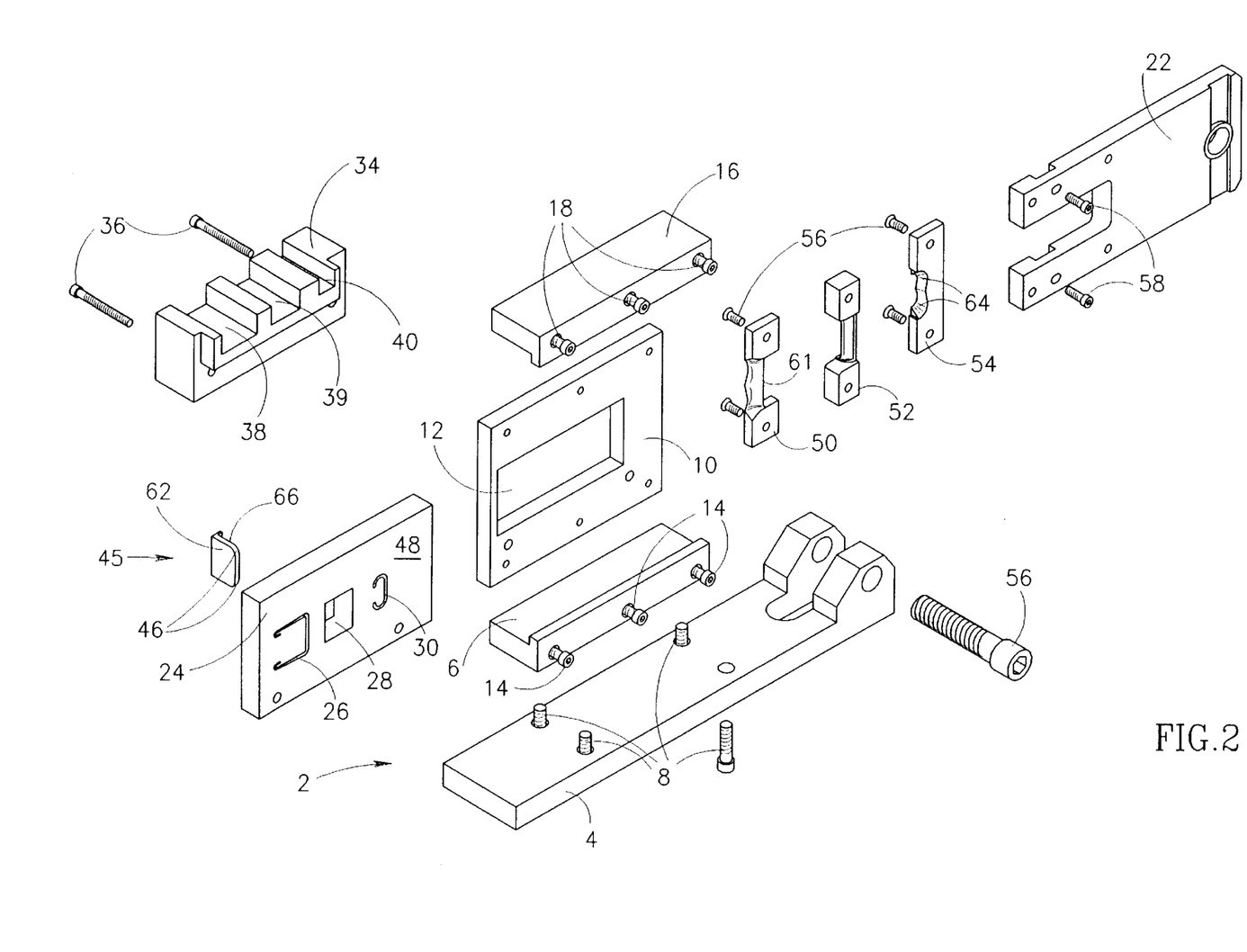
FIG. 2 is an isometric exploded view of the cutter seen in FIG. 1, without the operating lever.

Reference is first made to FIGS. 1 and 2 of the drawings in which a cutter 1 consists of a framework generally designated 2 having a base member 4 and a bottom support member 6 having an inverted L-like shape secured to the base member 4 by bolts 8. A bracket 10 has an opening 12 and is attached to the bottom support member 6 by bolts 14. A top support member 16, also having an inverted L-like shape, is secured at the top of the bracket 10 by bolts 18, whereby two parallel grooves 20 are formed, suitable for slidingly receiving a support member 22, as will hereinafter be explained in more detail.

Figure 5A:
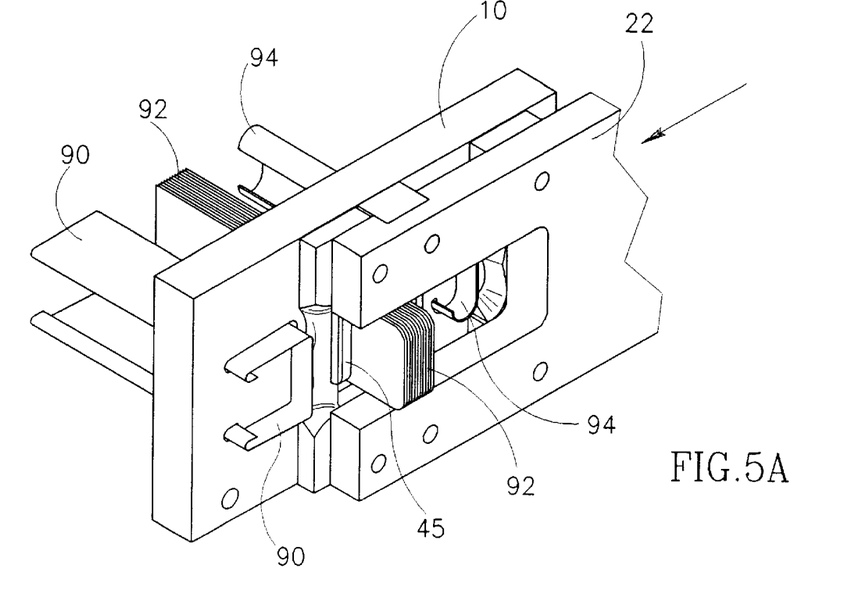
FIGS. 5A to 5C are isometric portions of the cutter according to the present invention illustrating three consecutive steps of shortening a blind.
Figure 5B:
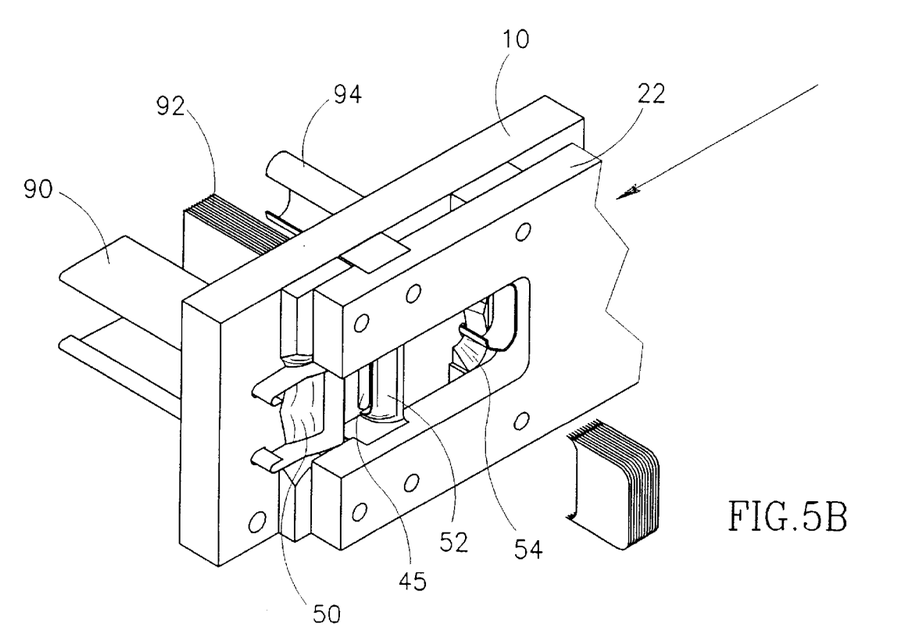
Figure 5C:
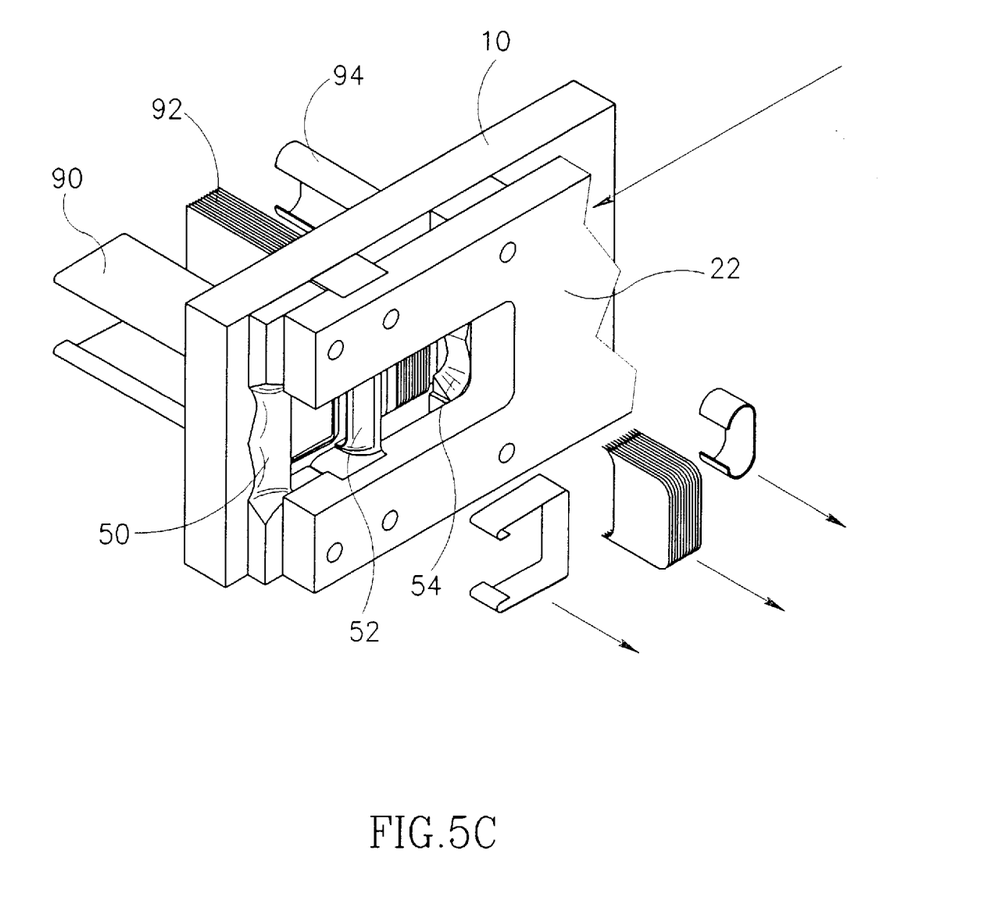

A matrix plate 24 is fixed to bracket 10 between the grooves 20 by bolts 14, the matrix comprising first, second and third openings 26, 28 and 30 respectively, being in register with the opening 12 of the bracket 24. Each of the openings have the respective shape of the cross-section of the top rail, slats and bottom rail of a venetian blind (as seen in FIGS. 5A to 5C).

A support block 34 is secured to the back face of the bracket 10 by bolts 36. The block 34 is formed with three grooves 38, 39 and 40 and is mounted at a suitable level for supporting the respective top rail, slats and bottom rail of the venetian blind in an essentially horizontal position and in alignment with the openings 26, 28 and 30 of the matrix plate 24.

An insert 45 with rounded corners 46 is attached within opening 28 of the matrix 24 so that it projects beyond the inner surface 48 of the matrix 24, the reason of which will hereinafter be explained.

The sliding support member 22 is fitted with a first blade 50, a second blade 52 and a third blade 54, attached to the support member 22 by bolts 56 and 58, the arrangement being such that the first and third blades 50 and 54 are adapted for sliding flush over the surface 48 of the matrix 24 over the openings 26 and 30 respectively, whereas blade 52 is elevated from the surface 48 and is adapted for sliding over the insert 45, the blade assuming the shape of the projecting portion of insert 45.

A lever 55 is pivotally hinged by bolt 56 to the base member 4 and a link 57 is hinged at 58 to the lever 55 and at 59 to the support member 22, whereby shifting the lever 55 to its forward position (as indicated by arrow 60 in FIG. 3) brings about displacement of the support member 22 with the associated blades 50, 52 and 54.

Figure 3:
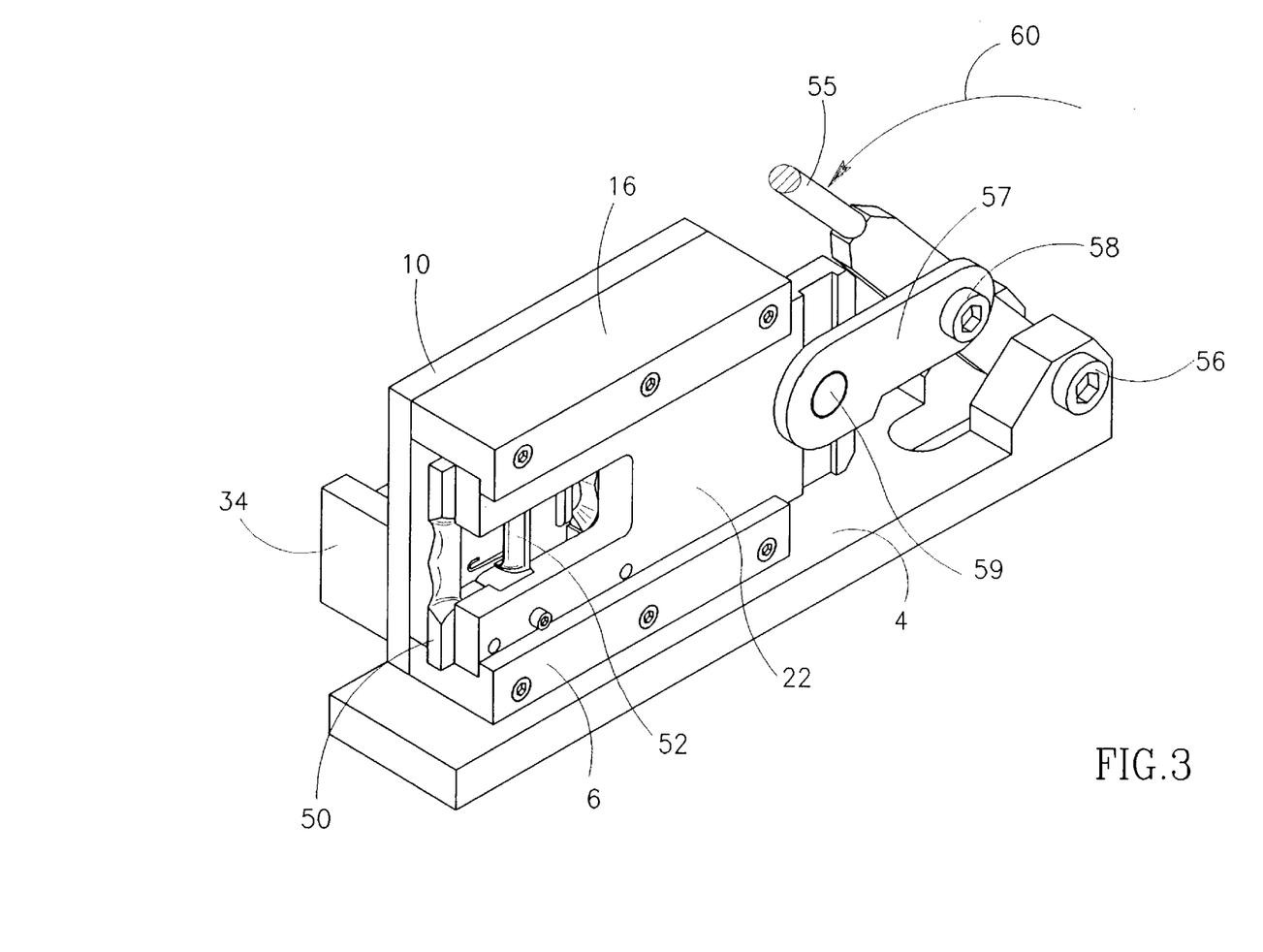
FIG. 3 is an isometric view of the cutter seen in FIG. 1 in the cutting position.

The arrangement is such that rearward displacement of the support member 22 (i.e, in a direction opposite to that represented by arrow 60 in FIG. 3) is restricted by the rear face 61 of the first blade 50 encountering the front face 62 of the insert 45. On the other hand, forward displacement of the support member 22 is restricted by the front facing flat portion 64 of the third blade 54 encountering the rear face 66 of the insert 45.

Where the matrix plate is provided with more than one second opening, the distance between the second openings does not exceed the distance between two adjacent loops of ladder string, where said distance is standard for various types of venetian blinds, as known in the art.

Figure 4:
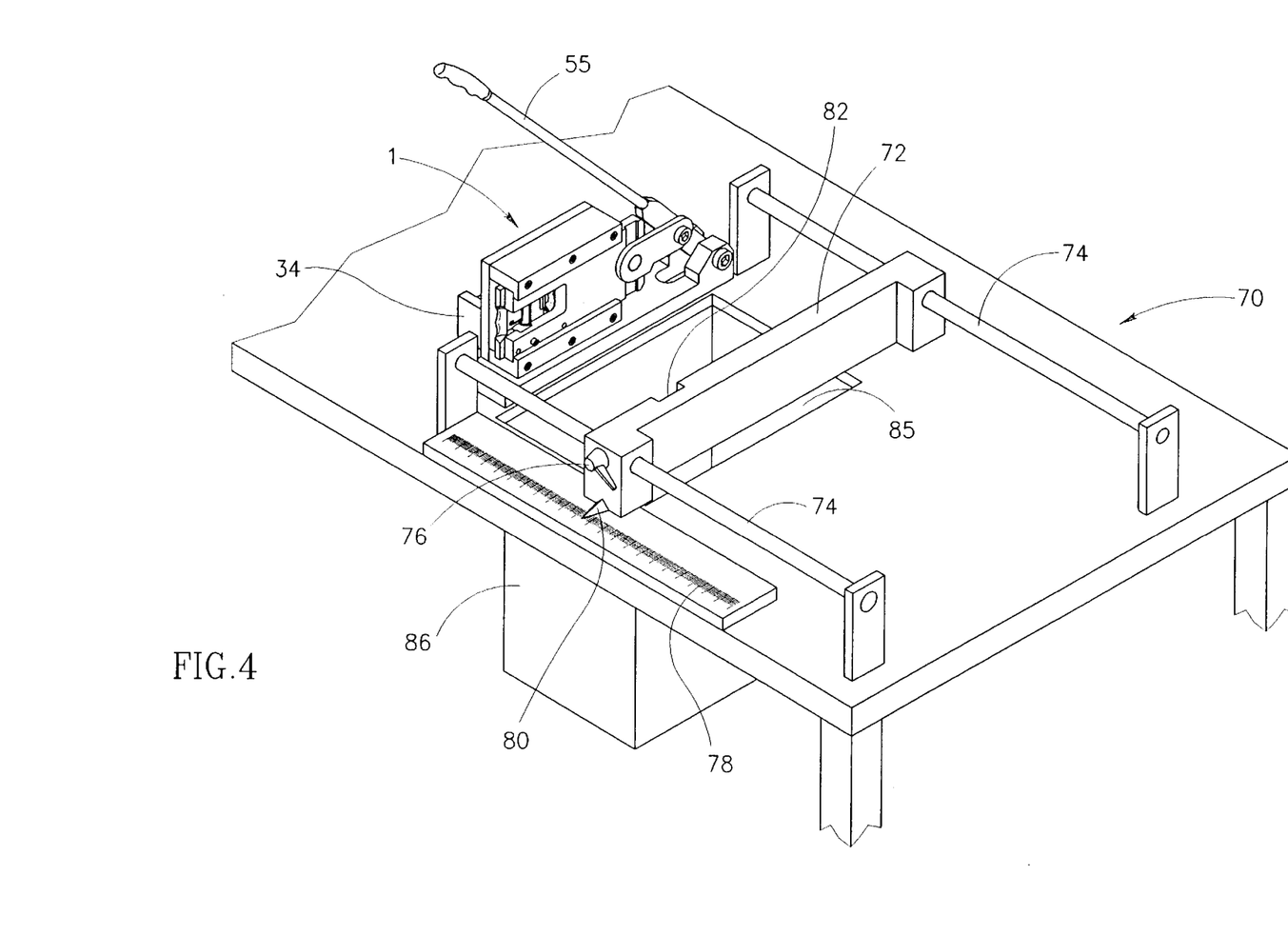
FIG. 4 is an isometric view of a cutter according to the invention mounted on a work bench.

Attention is now directed to FIG. 4 in which a cutter 2 according to the present invention is mounted on a work bench 70. A positioning bar 72 is slidable over two parallel rods 74 having their longitudinal axes parallel with that of the openings of the matrix 24, and a fastener 76 for setting the bar 72 at a required position as measured over the scale 78 by indicator 80. The bar 72 has an indention 82 in register with the second opening 28 of the matrix 24.

The work bench 70 further comprises an aperture 85 with a waste collecting compartment 86 for collecting cutting waste.

In operation, the bar 72 is set to the required position and fixed by fastener 76 and a blind is introduced into the cutter 2 with the top rail 90 accommodated within the first opening 26 of the matrix, the slats 92 within opening 22 and the bottom rail 94 within openings 30, as seen in FIGS. 5A to 5C. The end of slats 92 are received in indention 82 of the bar 72 for obtaining an even length of the rails and slats, in spite of the projection of the insert 45 from surface 48 of the matrix 24. The blinds rest over the support block 34 in an essentially horizontal position and in alignment with the longitudinal axis of the openings of the matrix 24. If desired, a clamp (not shown) may be used for fixing the blind in position.

Then, the lever 50 is shifted into its forward position as in FIGS. 3 to 5, wherein the second blade 52 slides over the slats 92 and over the insert 45 to cut off the slats (as seen in FIG. 5A). Gradually, the first blade 50 slides over surface 48 of the matrix, engaging the top rail 90 and beginning cutting same (as seen in FIG. 5B). Only after the slats are cut, the third blade 54 engages the bottom rail 94 and gradually cuts it (as seen in FIG. 5C). This arrangement of gradually cutting the components of the blind, ensures applying less force for cutting the blind. Furthermore, blades of different mechanical properties may be used for cutting the different components of the blind made of different material, thus ensuring improved surface quality of the cut blind and increased life time of the blades. The cutting waste falls through aperture 85 into the collecting compartment 86. Then, the process is repeated with the opposed end of the blind, whereby equal portions are cut at both ends of the blind.

It should be obvious to a person versed in the art that other means may be used for displacing the sliding support member 22, e.g. a hydraulic piston, a solenoid, etc.

Figure 6:
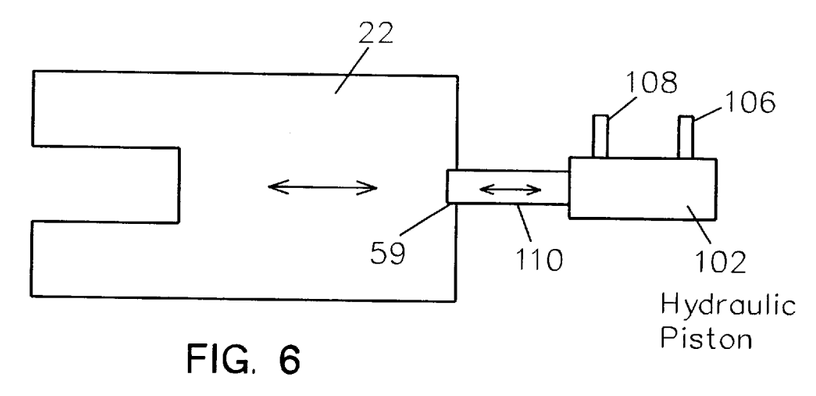
FIG. 6 is a partial schematic view of a cutter according to the invention with a hydraulic displacing mechanism.
Figure 7:
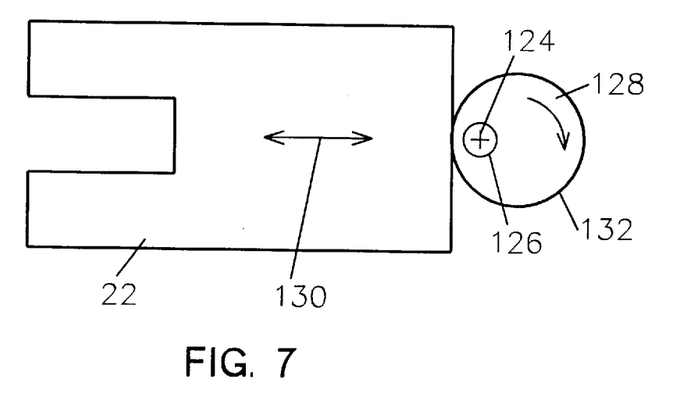
FIG. 7 is a partial schematic view of a cutter according to the invention with a cam follower displacing mechanism.

Further attention is now directed to FIGS. 6 and 7 schematically illustrating, with parts omitted, different embodiments in accordance with the invention of displacing mechanisms for actuating a complete cutter assembly similar to that in FIGS. 1–4.

In FIG. 6, the piston 102 comprises an inlet port 106 and an outlet port 108 for ingress and egress of hydraulic fluid, respectively, as known in the art. Piston rod 110 is connected at 59 to the blade support member 22. Extension of the piston rod 110 from the piston 102 entails displacement (to the left in FIG. 6) of the blade support member 22 in a cutting stroke, and vice-versa.

It is apparent that the piston 102 may be replaced with a known solenoid-type linear actuator 102, whereby the parts 106, 108 would instead represent electrical power leads.

In FIG. 7, on the shaft 126 of a motor (not shown) there is mounted a cam member 128 eccentrically fixed to the shaft 126. The peripheral face 132 of the cam member 126 is maintained in contact, with the blade support member 22, whereby rotating the shaft 126 of the motor about the axis 124 provides reciprocating displacement (arrow 130) of the blade support member 22, as known per-se.

I claim:

1. A cutter for shortening blinds of the type having a top rail, a bottom rail and a plurality of slats suspended therebetween, the cutter comprising a framework, a stationary matrix fixed with respect to the framework and comprising a first opening for receiving the top rail of the blinds, at least one second opening for receiving the slats in a compacted position, and a third opening for receiving the bottom rail, said openings being spaced apart in a longitudinal direction, the first and third openings having shapes corresponding with the cross-sectional shape of the respective top and bottom rails; a support member slidably mounted with respect to the matrix for motion in said longitudinal direction of the openings and comprising a first blade for cutting only the top rail, at least one second blade for cutting only the slats and a third blade for cutting only the bottom rail, and displacing means for displacing the support member along its slidable mounting with respect to the matrix to cut said top rail, slats and bottom rail with said blades, respectively.

2. A cutter according to claim 1, wherein the distance between the openings is similar to or less than the distance between two adjacent loops of a ladder string linking the slats to the top and bottom rails.

3. A cutter according to claim 1, wherein the at least one second opening of the matrix comprises a lateral projection with rounded edges and wherein the at least one second blade is flush with the lateral projection.

4. A cutter according to claim 1, wherein at least the first and third blades have a pointed edge.

5. A cutter according to claim 1, wherein the framework further comprises guides corresponding with the openings for supporting the rails and slats, the guides having longitudinal axes perpendicular to said longitudinal direction of the openings.

6. A cutter according to claim 1, wherein the blades are disposed so as to gradually engage at least the top and bottom rail.

7. A cutter according to claim 1, wherein said displacing mechanism is a lever swingably hinged to the framework and hingedly coupled by a link to the support member.

8. A cutter according to claim 1, wherein said displacing means includes a hydraulic operated piston.

9. A cutter according to claim 1, wherein said displacing means includes a cam and follower mechanism.

10. A cutter according to claim 1, wherein at least said first and third blades are flush with a surface of said matrix.

11. A cutter according to claim 1, wherein said blades are spaced apart to start a cutting of said blind by each said respective blade at a different time, whereby force required for cutting is reduced.

12. A cutter for shortening blinds of the type having a top rail, a bottom rail and a plurality of slats suspended therebetween, the cutter comprising a framework, a matrix connected to the framework and comprising a first opening for receiving the top rail of the blinds, at least one second opening for receiving the slats in a compacted position, a third opening for receiving the bottom rail; a support member including a first blade for cutting only the top rail, at least one second blade for cutting only the slats, and a third blade for cutting only the bottom rail, and means for displacing the support member and the matrix one relative to the other to cut said top rail, slats, and bottom rail with said blades, respectively, when a blind is positioned in said cutter and said support member and matrix move relative to each other.

* * * * *